United States Patent Office 3,414,807
Patented Dec. 3, 1968

3,414,807
DIGITAL VOLTMETER EMPLOYING DISCHARGE OF A LARGE CAPACITOR IN STEPS BY A SMALL CAPACITOR
Hugh Maitland Evans, Newbridge, Wales, assignor to International Standard Electric Corporation, New York, N.Y., a corporation of Delaware
Filed June 25, 1964, Ser. No. 377,893
4 Claims. (Cl. 324—111)

ABSTRACT OF THE DISCLOSURE

Apparatus is provided for measuring the ratio of two potentials. A first capacitor is charged to an unknown potential. A second, and much smaller, capacitor is then alternately connected across the first capacitor and short circuited repeatedly until the potential on the first capacitor has decreased to equal a reference potential. A counter measures the number of times the second capacitor is discharged thereby providing a count proportional to the ratio of the unknown potential and the reference potential.

---

The invention relates to digital voltage measuring apparatus.

According to one aspect of the invention there is provided digital D.C. voltage measuring apparatus including a first capacitor, a second capacitor of smaller value, a source of reference voltage not greater than the smallest voltage it is desired to measure, means for charging the first capacitor to the voltage to be measured, means for repeatedly charging the second capacitor from the first capacitor and then discharging the second capacitor until the voltage across the first capacitor has fallen to the reference voltage, and means for counting the number of times the second capacitor has been so charged from the first capacitor.

According to another aspect of the invention there is provided a digital D.C. voltage measuring apparatus including a pair of unequal capacitors, a source of reference voltage not greater than the smallest voltage to be measured, means for charging the larger of the pair of capacitors to the voltage to be measured, means for discharging the larger capacitor in successive steps by charge-sharing with the smaller capacitor, and means for counting and for indicating the count of the number of successive steps required for the voltage of the larger capacitor to be reduced to the reference voltage.

Embodiments of the invention also include amplifier and automatic attenuator apparatus for handling A.C. signals and for providing from them a D.C. output for feeding to digital apparatus specified above.

Figure 1:
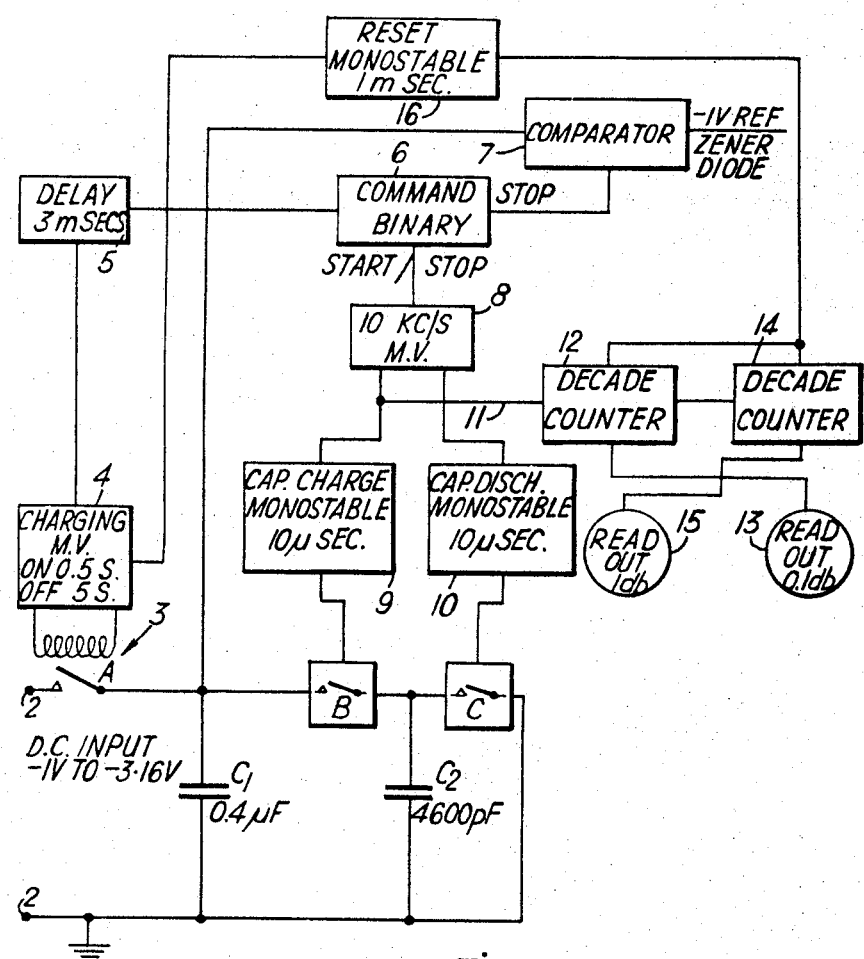
Figure 2:
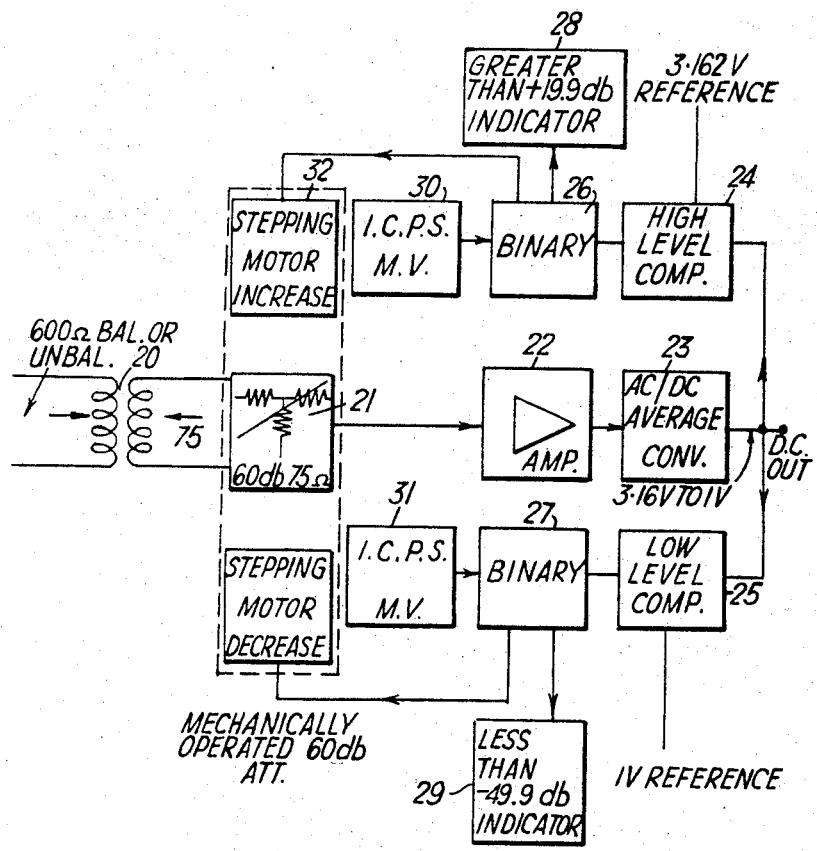

An embodiment of the invention will be described with reference to the accompanying drawings, in which:

FIG. 1 is a block schematic diagram illustrating the basic principle of the invention; and FIG. 2 is a further block schematic diagram showing the A.C. signal amplifier and automatic attenuator arrangements.

The basic principle of the invention is that a capacitor $C_1$ (FIG. 1) is connected through a switch A to one of a pair of terminals 2, to which terminals there is applied a D.C. voltage to be measured. When the capacitor $C_1$ has been fully charged to the input voltage V, say, the switch A is opened and a switch B is closed, which connects in parallel with $C_1$ a second, uncharged, capacitor $C_2$.

The charge on $C_1$ is shared with $C_2$, the voltage across the pair of capacitors being thereby reduced by the factor $k = C_1/C_1 + C_2$, the two capacitances are isolated from one another by reopening the switch B, and $C_2$ is then discharged by closure of a switch C. When $C_2$ is fully discharged, switch C is opened and the process commencing with the closure of switch B is repeated as often as is necessary, any $n$ times in all, to reduce the voltage across $C_1$ to a reference voltage $V_r$, say. Since at each charge-sharing step the voltage across the capacitor $C_1$ is reduced by the factor $k$, after $n$ such steps the voltage $V_n$ across $C_1$ is given by $$V_n = k^n V$$

while either $V_n = V_r$, or, as is more likely to be the case, $V_r$ lies between $V_{n-1}$ and $V_n$, so that $V_n$ is less than $V_r$ by a factor smaller than $k$. In the first case $$k^n V = V_r$$

so that $$\log (V/V_r) = -n \log k$$

i.e. the logarithmic ratio of the voltage V to the reference voltage $V_r$ is directly proportional to the number of charge-sharing steps $n$ which have been made, the size of the voltage reduction factor at each step being determined solely by the ratio of the two capacitances. In particular, if the ratio of $C_1/C_2$ is chosen to be $86.35_8$, then $-20 \log_{10} k = 0.1$, and the decibel ratio of $V/V_r$ is $n \times 0.1$ db.

In the more general case where $V_r$ may lie between $V_{n-1}$ and $V_n$, $$Vk^n < V_r < Vk^{n-1}$$

$$n \log (1/k) > \log (V/V_r) > (N-1) \log (1/k)$$

so that, in the case where $20 \log_{10} (1/k) = 0.1$, the decibel ratio of $V/V_r$ is given by $$20 \log_{10} (V/V_r) = n \times 0.1 \text{ db}$$

within the limits of $+0$ and $-0.1$ db. Thus a two-decade counter enables the voltage V to be determined, within the above limits, in 0.1 db steps from 0 db to 9.9 db with respect to the reference voltage $V_0$. The voltage $V_0$ may conveniently be made 1 volt, so that a voltage range of from 1 to 3.16 volts is provided. Since, in practical applications it is more usual to wish to compare A.C. signals with a given reference level, the range of the apparatus may be extended with aid of an amplifier, whose output is suitably rectified, and a mechanical attenuator, which is automatically set and provided with a read-out indication means, to bring the output D.C. signal level to within the range of the D.C. measuring equipment outlined above. The amplifier gain may be adjusted so that a D.C. output of 1 volt corresponds to a signal input of 0 dbm into 600 ohms, for example.

In the practical embodiment shown in block schematic form in FIG. 1, the switch A is provided by the contacts of a reed relay 3 which is periodically energised by a charging multivibrator 4 for 0.5 second and then allowed to remain with the switch A open for a further 5 seconds. The charging multivibrator 4 also feeds pulses to a delay circuit which, after a delay of 3 milliseconds, transmits a corresponding starting pulse to a further circuit 6 labelled Command Binary. A second input terminal to the circuit 6 is fed from a comparator 7 which continuously compares the voltage across capacitor $C_1$ with a reference voltage of 1 volt obtained from a Zener diode. When the voltage across $C_1$ falls to that across the Zener diode, the comparator 7 sends out a stop pulse to the command binary circuit 6. The circuit 6 feeds start and stop pulses to a 10 kc./s. multivibrator 8. The multivibrator 8 feeds, alternately, respective capacitor charge and discharge monostable circuits 9 and 10 which provide 10 μs. pulses for switching the respective switches B and C, which are bipolar static switches.

For counting the number of times that $C_2$ has been connected in parallel with $C_1$, a lead 11 from the capacitor charge monostable circuit 9 is connected to a decade counter 12 whose count is displayed on a read-out device 13 in numerical form. The counter 12 also triggers a further decade counter 14 provided with numerical display means 15.

At the end of the five second off phase of the switch A, a pulse is delivered from the charging multivibrator 4 to a monostable circuit 16 which then supplies a 1 ms. resetting pulse to the decade counters to return them to zero. Thus the D.C. input voltage at terminals 2 is sampled every 5.5 seconds, ½ second is allowed for charging the capacitor $C_1$ and then the measurement is completed within 14 milliseconds, so that the result, in decibels, remains displayed for over 4½ seconds before the counters are reset and the input voltage sampled once more.

Arrangements for dealing with A.C. signals and for providing from them a D.C. output within the range of the apparatus of FIG. 1 are shown in block schematic form in FIG. 2. The signals to be measured are fed in through a transformer 20 whose output is taken to a mechanically operated 60 db attenuator 21. From the attenuator signals are fed to an amplifier 22, nominally of 50 db gain, whose output is rectified in an A.C./D.C. average converter 23. The D.C. output from converter 23 is taken to two comparators, a high level comparator 24, where the signal is compared with a reference voltage of nominally 3.16 volts and a low level comparator 25, where the D.C. signal is compared with a reference voltage of nominally 1 volt. These two comparators feed respectively binary circuits 26 and 27. When the voltage from the A.C./D.C. converter falls between 1 and 3.162 v. no control pulse is developed in 24 or 25 and binaries 26 and 27 are at rest. When the D.C. voltage passes through the appropriate reference voltage a pulse is generated in 24 or 25 causing the associated binary to assume its second state. This change of binary state pulses the appropriate one of a pair of attenuator stepping motors 32 and 33, so changing of the setting of attenuator 21 (in 10 db steps) in such a direction as to tend to bring the D.C. voltage from 23 into the limits 1 to 3.162 volts.

Multivibrators 30 and 31 running at about 1 c.p.s. reset the binaries to their initial state and thus in condition to accept further triggering pulses from 24 or 25. If, even when attenuator 21 is at an extreme setting, the voltage from A.C./D.C. converter 23 does not fall within the range 1 to 3.162 v. then the appropriate comparator holds the binary in one state and this condition is utilised by means of circuits 28 and 29, respectively, to operate an illuminated sign ">" or "<," i.e. the digital read out would be ">+19.9 dbm" or "<−49.9 dbm."

With the addition of the apparatus shown in FIG. 2 the D.C. measuring apparatus of FIG. 1 is converted into a transmission measuring set providing a digital output for inputs ranging from −49.9 db to +19.9 db with respect to 0 dbm 600 r. A stable oscillator can be provided with the equipment and coupled with attenuator pads so that the apparatus may be checked and calibrated.

Although the embodiment of the invention described provides a decade ouput in decibels with reference to 1 mw. 600 r., it is evident that other reference to voltages may be provided and that other logarithmic scale factors may also be used. Thus by arranging that the capacitance ratio of the capacitors $C_1$ and $C_2$ is 99.0 the measurement may be made to provide an output in terms of steps of 0.01 neper. On the other hand, if the two capacitors were made equal, a digital output may be made in binary notation.

What I claim is:

1. A digital voltage measuring apparatus comprising; a first capacitor; a second capacitor having a smaller value than the first capacitor; a source of reference voltage not greater than the smallest voltage it is desired to measure, a pair of input terminals, free running oscillator means automatically connecting the first capacitor across the input terminals for a predetermined first time interval and for isolating it from the terminals for a second time interval, a comparator for comparing the reference voltage with the voltage across the first capacitor and for providing a stop signal when these voltages are substantially equal, automatic switching means including a free running multivibrator responsive to a start signal from the free running oscillator for controlling the free running multivibrator and arranged to start the multivibrator after disconnection of the larger capacitor from the input terminals and to stop the multivibrator in response to said stop signal, switching circuits controlled by the multivibrator for repeatedly connecting the first and second capacitors in parallel, disconnecting them and discharging the smaller capacitor until the voltage across the first capacitor has fallen to the reference voltage thereby triggering the stop signal, voltage indicating counting means for counting the number of times the second capacitor has been charged by the first capacitor, means responsive to the stop signal for stopping said counting means, and means responsive to the stop signal for stopping the charging of said second capacitor from said first capacitor.

2. Apparatus as claimed in claim 1 wherein the ratio of the two capacitors is chosen to provide a count in decibel or fractional decibel steps.

3. Apparatus as claimed in claim 1 further including automatic counter-resetting means operable each time the larger capacitor is connected across the input terminals.

4. Apparatus as claimed in claim 1 including A.C. input terminals for signals whose voltage is to be measured, a mechanically operated stepping attenuator having associated means for indicating its setting and connected to the A.C. input terminals and feeding an amplifier, a rectifier circuit fed from the amplifier and arranged to provide a D.C. output corresponding to the amplified A.C. output, means for comparing the D.C. output with reference voltages corresponding to the maximum and minimum readings provided by the counting means and means for automatically adjusting the attentuator so that the D.C. output is between the two last mentioned reference voltages.

References Cited

UNITED STATES PATENTS

| | | | |
|---|---|---|---|
| 2,999,206 | 9/1961 | Stoddard | 324—111 X |
| 3,068,410 | 12/1962 | Galman | 324—119 X |
| 3,122,729 | 2/1964 | Bothwell. | |
| 3,187,323 | 6/1965 | Flood | 324—115 X |
| 3,193,803 | 7/1965 | Hoffman | 324—111 X |

ARCHIE R. BORCHELT, *Primary Examiner.*

E. F. KARLSEN, *Assistant Examiner.*